(12) United States Patent
Madsen et al.

(10) Patent No.: US 10,208,994 B2
(45) Date of Patent: Feb. 19, 2019

(54) METHOD FOR CONFIGURING A REFRIGERATION SYSTEM

(71) Applicant: Danfoss A/S, Nordborg (DK)

(72) Inventors: Kenneth Bank Madsen, Ry (DK); Leif Skovvang Nielsen, Augustenborg (DK); Flemming Morten Schmidt, Sydals (DK); Frede Schmidt, Soenderborg (DK)

(73) Assignee: DANFOSS A/S, Nordborg (DK)

( * ) Notice: Subject to any disclaimer, the term of this patent is extended or adjusted under 35 U.S.C. 154(b) by 67 days.

(21) Appl. No.: 15/840,573

(22) Filed: Dec. 13, 2017

(65) Prior Publication Data

US 2018/0100679 A1    Apr. 12, 2018

Related U.S. Application Data

(63) Continuation of application No. 14/379,966, filed as application No. PCT/DK2013/000016 on Feb. 16, 2013, now Pat. No. 9,879,892.

(30) Foreign Application Priority Data

Feb. 21, 2012 (DK) .................................. 201200133

(51) Int. Cl.
  *F25B 49/02*  (2006.01)
  *G05B 15/02*  (2006.01)
  *G05B 19/05*  (2006.01)

(52) U.S. Cl.
  CPC .............. *F25B 49/02* (2013.01); *G05B 15/02* (2013.01); *G05B 19/056* (2013.01)

(58) Field of Classification Search
  CPC ...... F25B 49/02; F25B 41/062; F25B 49/022; G05B 15/02; C09K 5/047; Y02B 30/62; F25D 29/008; F25D 29/00
  See application file for complete search history.

(56) References Cited

U.S. PATENT DOCUMENTS

2005/0165591 A1*  7/2005  Bahel .................... F25B 49/00
                                                    703/7
2005/0268630 A1* 12/2005  Pepin .................... F25B 39/02
                                                    62/203

* cited by examiner

*Primary Examiner* — Charles E Anya
(74) *Attorney, Agent, or Firm* — McCormick, Paulding & Huber LLP (57) ABSTRACT

The invention relates to a method for configuring, on a control unit, operating parameters of a plurality of devices of a refrigeration system. A user selects on the control unit, among the plurality of devices of the refrigeration system, a first device to configure. Information of valid configurable operating parameters of the first device is provided on the control unit. The user selects at least one of the valid configurable operating parameters of the first device, thereby configuring the first device. Information stored about operating parameters of other devices of the refrigeration system, based on the configuration of the first device, is then provided on the control unit. Finally, the user confirms, on the control unit, one or more operating parameters of one or more of the other devices, thereby configuring the one or more other devices. The invention also relates to a control unit and a refrigeration system.

20 Claims, 7 Drawing Sheets

METHOD FOR CONFIGURING A REFRIGERATION SYSTEM

CROSS REFERENCE TO RELATED APPLICATIONS

This application is a continuation of U.S. application Ser. No. 14/379,966, filed on Aug. 20, 2014, now U.S. Pat. No. 9,879,892, which is the National Stage of International Patent Application No. PCT/DK2013/000016 filed on Feb. 16, 2013, which claims priority to Danish Patent Application No. PA201200133 filed on Feb. 21, 2012, each of which is hereby incorporated herein by reference in its entirety.

FIELD OF THE INVENTION

The invention relates to a method for configuring, on a control unit, operating parameters of a plurality of devices of a refrigeration system. The invention also relates to a control unit for a refrigeration system and to a refrigeration system.

BACKGROUND OF THE INVENTION

It is known to configure refrigeration systems by configuring individually operating parameters of the plurality of devices such as one or more of the following devices: compressors, condensers, e.g., gas coolers, receivers, evaporators and other devices constituting devices of the refrigeration system.

Individual configuration of the operating parameters of the devices of the refrigeration system may lead to configurations being wrong in relation to correct operation of the refrigeration system. Individual configuration of the operating parameters of the devices of the refrigeration system also requires special skills of the operator configuring the refrigeration system in relation to knowledge of general of interaction between different devices of the refrigeration system and knowledge of the valid operating parameters of each of the devices of the refrigeration system. Such knowledge the operator does not always have, especially not operators being new within the technical area of refrigeration systems, or operators not configuring refrigeration systems at a regular basis.

US 2006/0212174 discloses a method to selectively present a list of parameter options on a front end device that can be used to configure a target device. The method comprises the steps of, selecting a target device to be configured, displaying a list of configurable parameters, selecting a parameter to configure, querying the target device for a set of valid parameter options, returning a set of valid parameter options from the target device to the front end device based on the current state of the target device, and displaying the list of valid parameter options on the front end device. The solution disclosed in US 2006/0212174 has the disadvantage that the front end device is only configuring one device at a time, and the configuration being individual for each of the devices, and the configuration being based upon individual input from each of the devices.

SUMMARY OF THE INVENTION

It is an object of the present invention to provide a method of configuring a refrigeration system so that there are no, or at least only a limited number, of operating parameters of each of a plurality of devices of the refrigeration system which is configured so that the refrigeration system will not operate according to an intended operation of the refrigeration system. It may also be an object of the present invention to make it easier, safer and faster for an operator to configure a refrigeration system with a plurality of different devices. It is furthermore an object of the present invention to provide a control unit and a refrigeration system with such a control unit ensuring correct operation of the refrigeration system after configuration of at least some of the plurality of devices.

The one or more objects of the present invention may be obtained by a method comprising the steps of:
  selecting among the plurality of devices of the refrigeration system, on the control unit, a first device to configure,
  providing, on the control unit, information of valid configurable operating parameters of the first device;
  selecting at least one of the valid configurable operating parameters of the first device, thereby configuring the first device;
  providing, on the control unit, information of operating parameters of other devices of the refrigeration system, based on the configuration of the first device,
  the information of operating parameters of the other devices being based on stored data of the plurality of devices of the refrigeration system,
  confirming, on the control unit, one or more operating parameters of one or more of the other devices, thereby configuring the one or more other devices.

Configuring one or more other devices, based on an operator manually configuring at least one first device different than other devices, result in the other devices being configured correctly in relation to the configuration of the first device, without the operator having to know valid configuration parameters of the other devices. The control unit has information of the plurality of devices of the refrigeration system which the control unit controls, and based on the information, the control unit can automatically configure the other devices based on manual configuration of one or more first devices.

According to an aspect of the invention, the method comprises the steps of
  providing, on the control unit, information of valid configurable parameters of one or more of the other devices,
  selecting at least one of the valid configurable parameters of the one or more other devices, thereby configuring the one or more other devices.

If operating parameters of the one or more first devices or if operating parameters of the other devices, which the control unit has configured automatically, is not the operating parameters which the operators want, then the operator may select other operating parameters, the operator may manually change the automatically configured operating parameters, and thereafter the operator may confirm all the operating parameters. Thus, confirming all the operating parameters result in confirmation of the manually configured operating parameters of the one or more first devices, confirmation of any other operating parameters changed manually, and confirming any operating parameters configured automatically.

According to another aspect of the invention, the step of selecting, on the control unit, a first device to configure includes
  providing information, on the control unit, of a plurality of devices to be configured of at least part of the refrigeration system, where the first device to configure is a device of the part of the refrigeration device and a device for which information is provided, and where selecting at least one valid configurable operating parameter of the first device is performed by designating the first device, and where, optionally, selecting at least one valid configurable operating parameter of the first device is performed also by designating a parameter.

Configuration of the first device may be performed by just designating the first device, without the operator entering any operating parameters of the first device. The control unit may have information of a default operating parameter of the first device, which default operating parameter is selected by designating the first device. However, optionally, the operator may designate an operating parameter, after having designated the first device, either if the control unit does not have information of an operating parameter of the device, or if the operator wants to select another operating parameter than the default parameter.

In a possible embodiment of a control unit for performing the method according to the invention, and when applying the method according to the invention, the selection of the first device is performed by one or more of the following actions: touching on a touch-screen display of the control unit a row, column or cell naming the first device, or speaking out to a microphone of the control unit a naming of the first device.

Selection of a first device may be done tactile by touching a touch screen on a visual display, or by speaking out a name, a number or other designation of the first device to select to a microphone of the control unit, and where the control unit comprises speak recognition software transferring the speech received by the microphone to a designation of a first device of the refrigeration system.

According to a possible aspect of the invention, the step of selecting, on the control unit, the first device includes displaying a drawing of a plurality of devices to be configured of at least part of the refrigeration system, and where the first device is displayed in the drawing of the plurality of devices of the part of the refrigeration device, and where selecting the first device is performed by designating the first device in the drawing.

A drawing showing more or less of the plurality of devices of the refrigeration system makes it easy, safe and reliable to the operator selecting the right device to configure. Designation of the device to configure may be by a selection on a menu of possible devices to configure, by touching in the drawing displayed on a touch screen the device to configure or by speaking out the name, a number or other designation of the device in the drawing. Any designation capable of distinguishing the one device from the other devices being part of the refrigeration system is possible to use for designating the device to configure.

According to one possible aspect of the invention, the method comprises providing additional devices, not controlled by the control unit controlling the one or more first devices and other devices, and where the additional devices comprises an evaporator with refrigerant passed to an inlet of the evaporator, designating as a first device, which is controlled by the control unit, a condenser, preferably a gas cooler, and where a pressure of the refrigerant at the outlet of the condenser is configured by the control unit so that the temperature of the refrigerant at the inlet of the evaporator is between plus 10 degrees Celsius and minus 30 degrees Celsius, and configuring operating parameters of one or more of the other devices, which are also controlled by the control unit, the configuration of other devices being based upon the configuration of outlet pressure of the refrigerant from the condenser.

The present invention makes it possible to configure the condenser, such as the gas cooler, as the first devices and other devices as well, so that a temperature of one or more evaporators is at a desired level, also in the case, where the control unit is not configuring evaporators as such. Because of close integration between configuration of the first device and the other devices, without the risk of incorrect configuration, the one or more evaporators will operate at desired operating parameters without need for the control unit controlling evaporators.

According to another possible aspect of the invention, the method comprises providing additional devices, not controlled by the control unit controlling the one or more first devices and other devices, and where the additional devices comprises an evaporator with refrigerant passed to an inlet of the evaporator, designating as a first device, which is controlled by the control unit, a receiver, and where a pressure of the refrigerant inside the receiver is configured by the control unit so that the temperature of refrigerant at the inlet of the evaporator is between plus 10 degrees Celsius and minus 30 degrees Celsius, and configuring operating parameters of one or more of the other devices, which are also controlled by the control unit, the configuration of other devices being based upon the configuration of the pressure of the refrigerant inside the receiver.

The present invention makes it possible to configure the pressure of the refrigerant in the receiver as the first devices and other devices as well, so that a temperature of one or more evaporators is at a desired level, also in the case where the control unit is not configuring evaporators as such. Because of close integration between configuration of the first device and the other devices, without the risk of incorrect configuration, the one or more evaporators will operate at desired operating parameters without need for the control unit controlling evaporators.

BRIEF DESCRIPTION OF THE INVENTION

The invention will hereafter be described with reference to the drawings, where.

DETAILED DESCRIPTION OF THE INVENTION

Figure 1:
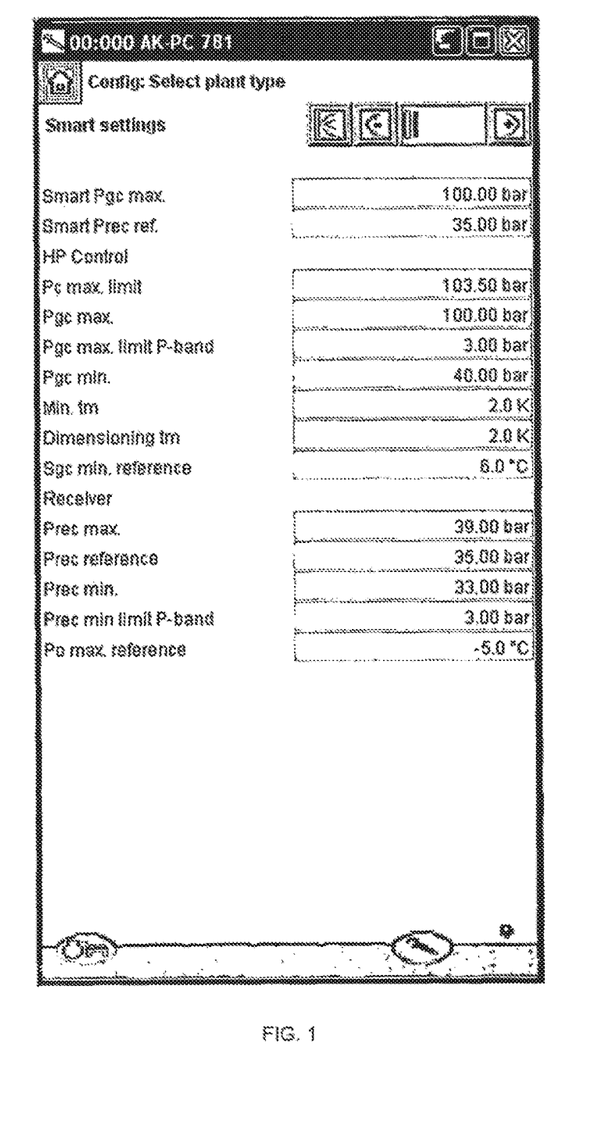
FIG. 1 is a diagram shown at an information exchange interface, and which is one embodiment of configuring a first device of a refrigeration system.

FIG. 1 is an example of one page of an information exchange interface of a control unit of at least part of a refrigeration system. In the following, the invention is described with reference to a control unit with an information exchange interface of a refrigeration system using carbon dioxide, $CO_2$, as the refrigerant.

The information exchange interface comprises different rows and cells, each presented in rows, with operating parameters to select or to configured manually or automatically during configuration of the refrigeration system. In the example shown, the operating parameters intended to be configured manually by an operator during configuration of the refrigeration system are parameters named 'Smart Pgc max.' and 'Smart Prec ref.'

| | |
|---|---|
| Smart Pgc max. | 100 bar |
| Smart Prec ref. | 35.00 bar |

Smart Pgc max. is the pressure of a refrigerant after a refrigerant has passed a gas cooler of the refrigeration system. Smart Prec ref. is the reference pressure, lower than a maximum pressure, of the refrigerant in the receiver of the refrigeration system. In the example shown of the information exchange interface, the operator has manually configured Smart Pgc max to 100.00 bar and Smart Prec ref. to 35.00 bar, respectively.

Configuring of Smart Pgc max and Smart Prec ref. is based on the gas cooler and/or the receiver being designated first devices of the refrigeration system. First devices are devices the operating parameters of which are manually configured by the operator, and which operating parameters are controlling other parameters of the first devices and which operating parameters are controlling operating parameters of other devices. Devices other than the first devices of the refrigeration system comprises, e.g., different valves, evaporators, compressors or even other devices, the operating parameters of which are controlled by the configuring of operating parameters of the gas cooler and the receiver.

Figure 2:
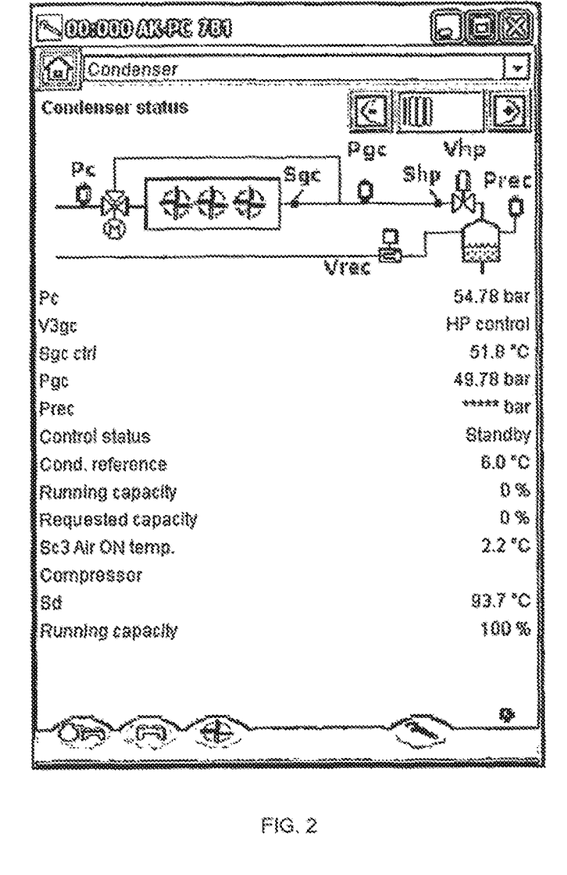
FIG. 2 is a diagram of part of a refrigeration system and with status of present operating parameters especially related to a condenser.
Figure 4:
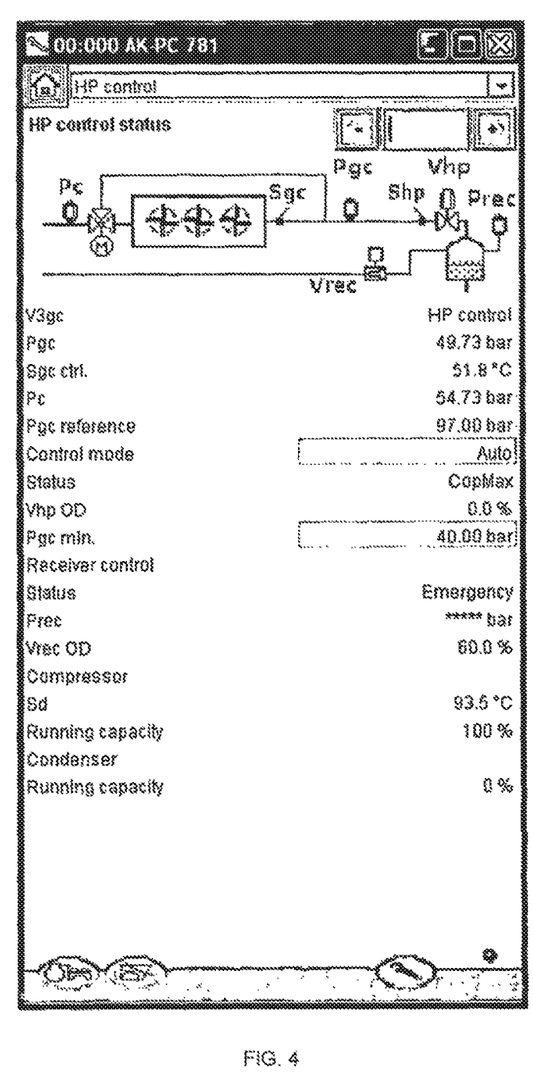
FIG. 4 is a diagram of part of a refrigeration system and with status of present operating parameters especially related to a high pressure side.
Figure 6:
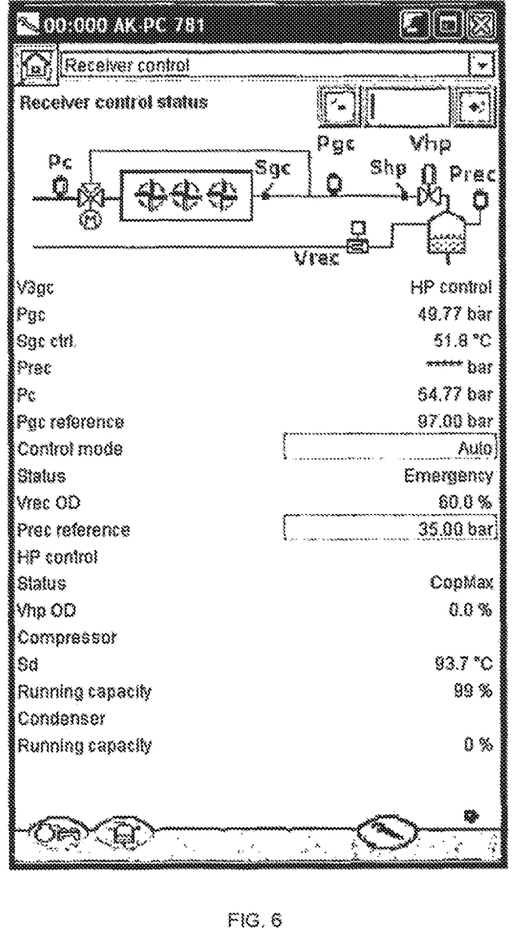
FIG. 6 is a diagram of part of a refrigeration system and with status of present operating parameters especially related to a receiver.

Reference is made to FIG. 2, FIG. 4 and FIG. 6 showing a drawing of devices of part of the refrigeration system comprising the gas cooler and the receiver.

Other parameters shown in the print-screen of the information exchange interface in FIG. 1 are parameters of the high pressure side, HP control, of the refrigeration system. The parameters configured when configuring the gas cooler and the receiver, i.e., configuring of the operating parameters Smart Pgc max. and Smart Prec ref., result in the following parameters of the high pressure side, HP control:

| HP Control | |
|---|---|
| Pc max. limit | 103.50 bar |
| Pgc max. | 100.00 bar |
| Pgc max. limit P-band | 3.00 bar |

| HP Control (continued) | |
|---|---|
| Pgc min. | 40.00 bar |
| Min. tm | 2.0 K |
| Dimensioning tm | 2.0 K |
| Sgc min. reference | 6.0° C. | where Pc max limit is a maximum limit of pressure of the refrigerant at the gas cooler the inlet, Pgc max. is a an alarm of the pressure of the refrigerant at the gas cooler outlet, Pgc max. limit is a an alarm of the pressure of the refrigerant at the gas cooler outlet, P-band is proportional band, Pgc min. is a lower alarm limit of the pressure of the refrigerant at the gas cooler outlet, Min tm is a minimum temperature mean difference (often the logarithmic mean temperature difference), Dimensioning tm is a value of the temperature mean difference (often the logarithmic mean temperature difference) when dimensioning the refrigeration system, and Sgc min reference is a minimum reference value of the temperature of the refrigerant at the gas cooler outlet.

The operating parameters called HP control shows the Pgc max, which is the operating parameter Smart Pgc max. configured by the operator, and where the operator selects the gas cooler as the first device to configure when configuring the refrigeration system. The other operating parameters of the HP control scheme is controlled and automatically configured by the value 100.00 bar configured by the operator as the Smart Pgc max.

There may be one or more of the other parameters of the gas cooler or of other devices part of the HP control, which the operator may configure individually. Configuring of other operating parameters requires that the one or more other parameters of the gas cooler or of other devices are within valid operating parameter intervals, when Smart Pgc max. initially is configured by the operator to 100.00 bar.

In case one or more other parameters of the gas cooler or of other devices part of the HP control scheme are configured individually by the operator, then the operator selects other parameter values than the parameter values suggested by the control unit, and then the operator confirms the selection of all the parameters, either configured by the operator or configured automatically. If the operator accepts all the other parameters values automatically configured by the control unit, the operator only needs to confirm all the parameter values, the operator does need to select other values.

Other parameters shown in the print-screen of the information exchange interface in FIG. 1 are parameters of the receiver of the refrigeration system. The parameters configured when configuring the gas cooler and the receiver, i.e., the Smart Pgc max. and Smart Prec ref., results in the following parameters of the receiver:

| Receiver | |
|---|---|
| Prec max. | 39.00 bar |
| Prec reference | 35.00 bar |
| Prec min. | 33.00 bar |
| Prec min limit P-band | 3.00 bar |
| Po max. reference | −5.0° C. | where Prec. max. is an upper alarm limit of the pressure of the refrigerant in the receiver, Prec reference is the pressure of the refrigerant as configured by the operator, Prec min is a lower alarm limit of the pressure of the refrigerant in the receiver, Prec min limit P-band is a minimum pressure limit of the refrigerant in the receiver around a selected proportional band, and Po max reference is a maximum reference pressure of the refrigerant at an evaporator inlet.

The operating parameters called Receiver shows the Prec reference, which is the operating parameter Smart Prec reference configured by the operator selecting the receiver as the first device to configure when configuring the refrigeration system. The other operating parameters of the Receiver control scheme is controlled by and automatically configured by the value 35.00 bar configured by the operator as the Smart Prec reference.

There may be one or more of the other parameters of the gas cooler or of other devices part of the receiver control scheme, which the operator may configure individually. Configuring of other operating parameters requires that the one or more other parameters of the receiver or of other devices are within valid operating parameter intervals, when Smart Prec reference initially is configured by the operator to 35.00 bar.

In case one or more other parameters of the receiver or of other devices part of the receiver control scheme are configured individually by the operator, then the operator selects other parameter values than the parameter values suggested by the control unit, and then the operator confirms the selection of all the parameters, either configured by the operator or configured automatically. If the operator accepts all the other parameters values automatically configured by the control unit, the operator only needs to confirm all the parameter values, the operator does need to select other values.

Figure 3:
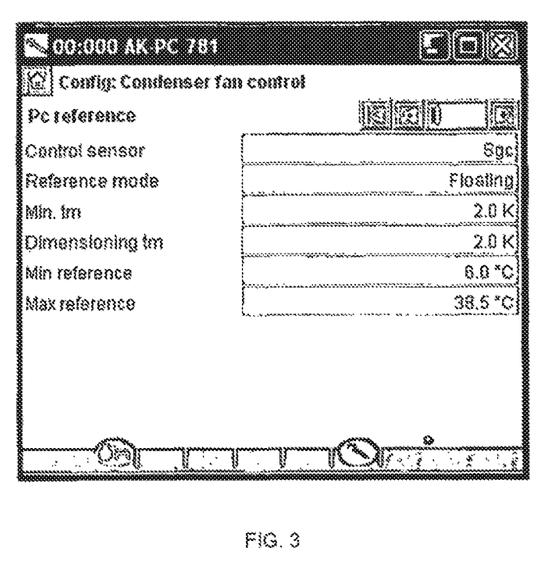
FIG. 3 is a sketch of an information exchange interface of a control unit for configuring operating parameters of the condenser of the refrigeration system.

FIG. 2 and FIG. 3 are print-outs of other views of the information exchange interface of a control unit showing operating parameters related to a condenser, that is to the gas cooler. The information exchange interface shows the drawing of the part of the refrigeration system and also shows operating parameters of the different devices of the part of the refrigeration system.

FIG. 2, with the operating parameter listed in FIG. 2 also shown below, shows the information exchange interface in a state where a condenser, that is the gas cooler, as a first device has been configured earlier on by an operator, while the devices of the refrigeration system, not being the condenser, are other devices of the refrigeration system. The state shown in FIG. 2 is where the refrigeration system is operating, after configuration of the refrigeration system. As example, Pgc is 49.78 bar, which is below the limit of 100.00 bar configured as the upper alarm limit by the operator (see FIG. 1).

| Pc | 54.78 bar |
| V3gc | HP control |
| Sgc ctrl. | 51.8° C. |
| Pgc | 49.78 bar |
| Prec | ***** bar |
| Control status | Standby |
| Cond. reference | 6.0° C. |
| Running capacity | 0% |
| Requested capacity | 0% |
| Sc3 Air ON temp. | 2.2° C. |
| Compressor Sd | 93.7° C. |
| Running capacity | 100% | where Pc is the pressure of the refrigerant at the gas cooler inlet, V3gc is a three-way gas cooler bypass valve to bypass the gas cooler, Sgc ctrl. is a control value of the temperature of the refrigerant at the gas cooler outlet, Pgc is the pressure of the refrigerant at the gas cooler outlet, Prec is the pressure of the refrigerant in the receiver, Cond. reference is the reference temperature of the refrigerant in relation to the condenser, i.e. the gas cooler, Sc3 is the temperature of the ambient air for cooling the gas cooler, and Sd is the discharge temperature of the refrigerant at the compressor outlet.

FIG. 3 is a print-out of a view of the information exchange interface, where a condenser fan control, that is the gas cooler fan control, may be configured.

| Control sensor | Sgc |
| Reference mode | Floating |
| Min. tm | 2.0 K |
| Dimensioning tm | 2.0 K |
| Min reference | 6.0° C. |
| Max reference | 38.5° C. |

In FIG. 3, further configuration by the operator is made by configuring one or more of the operating parameters listed above. Configuration of one or more of the parameters listed above may be performed by the operator to change the automatic configuration made by the control unit based upon configuration of Smart Pgc max. and/or the configuration of Smart Prec ref. Alternatively, configuration of one or more of the parameters listed above may be performed by the operator to configure operating parameters, which the control unit does not configure automatically.

FIG. 4, with the operating parameter listed in FIG. 4 also shown below, shows the information exchange interface in a state where also the condenser, that is the gas cooler, as a first device has been configured earlier on by an operator, while the devices of the refrigeration system, not being the condenser, are other devices of the refrigeration system. The state shown in FIG. 4 is where the refrigeration system is in operating, after configuration of the refrigeration system. As example, Pgc is 49.73 bar, which is below the limit of 100.00 bar configured as the upper alarm limit by the operator (see FIG. 1).

| V3gc | HP control |
| Pgc | 49.73 bar |
| Sgc ctrl. | 51.8° C. |
| Pc | 54.73 bar |
| Pgc reference | 97.00 bar |
| Control mode | Auto |
| Status | CopMax |
| Vhp OD | 0.0% |
| Pgc min. | 40.00 bar |
| Receiver control Status | Emergency |
| Prec | ***** bar |
| Vrec OD | 60.0% |
| Compressor Sd | 93.5° C. |
| Running capacity | 100% |
| Condenser Running capacity | 0% | where V3gc V3gc is a three-way gas cooler bypass valve to bypass the gas cooler, Pgc is the pressure of the refrigerant at the gas cooler inlet, Sgc ctrl. is a control value of the temperature of the refrigerant at the gas cooler outlet, Pc is the pressure of the refrigerant at the compressor outlet, Pgc reference is a reference pressure of the refrigerant at the gas cooler outlet, Vhp OD is an opening degree of a valve between the gas cooler outlet and the receiver, Sd is the discharge temperature of the refrigerant at the compressor outlet.

Figure 5:
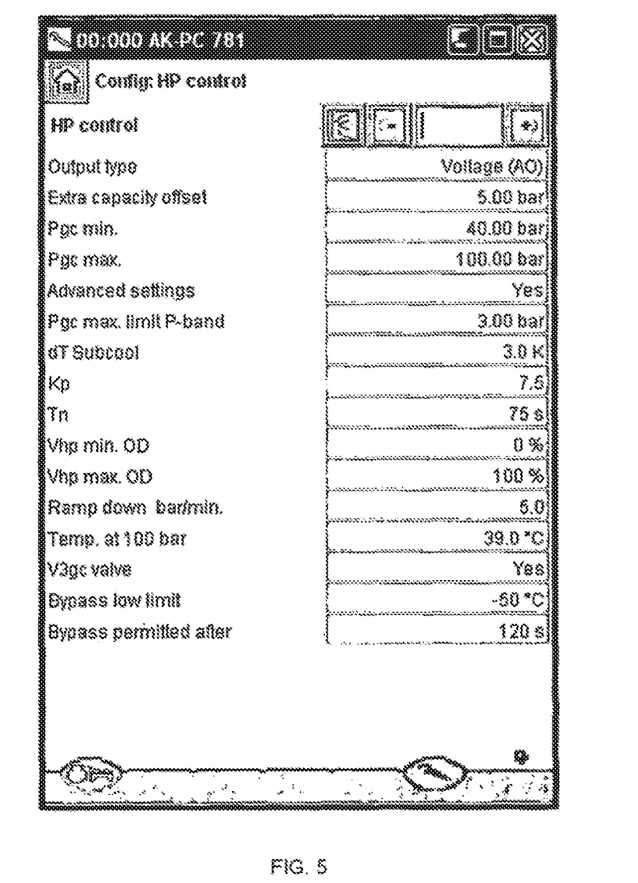
FIG. 5 is a sketch of an information exchange interface of a control unit for configuring operating parameters of the high pressure side of the refrigeration system.

FIG. 5 is a print-out of a view of the information exchange interface, where other operating parameters than Pgc of a high pressure side may be configured.

| Output type | Voltage (AO) |
|---|---|
| Extra capacity offset | 5.00 bar |
| Pgc min. | 40.00 bar |
| Pgc max. | 100.00 bar |
| Advanced settings | Yes |
| Pgc max. limit P-band | 3.00 bar |
| dT Subcool | 3.0 K |
| Kp | 7.5 |
| Tn | 75 s |
| Vhp min. OD | 0% |
| Vhp max. OD | 100% |
| Ramp down bar/min. | 5.0 |
| Temp. at 100 bar | 39.0° C. |
| V3gc valve | Yes |
| Bypass low limit | −50° C. |
| Bypass permitted after | 120 s | where Pgc min is a minimum pressure of the refrigerant at the gas cooler outlet, dT Subcool is s temperature difference between a temperature T1 and a temperature T2, Kp is a gain for a controller, Tn is an integration constant, Vhp min. OD is a minimum opening degree of a valve between the gas cooler outlet and the receiver, and Vhp min. OD is a maximum opening degree of a valve between the gas cooler outlet and the receiver.

In FIG. 5, further configuration by the operator is made by configuring one or more of the operating parameters listed above. Configuration of one or more of the parameters listed above may be performed by the operator to change the automatic configuration made by the control unit based upon configuration of Smart Pgc max. and/or the configuration of Smart Prec ref. Alternatively, configuration of one or more of the parameters listed above may be performed by the operator to configure operating parameters, which the control unit does not configure automatically. With reference to FIG. 5, the first device configured is the gas cooler and the operating parameter 100.00 bar (see FIG. 1) of the first device is the pressure after the refrigerant has passed the gas cooler.

FIG. 6, with the operating parameter listed in FIG. 6 also shown below, shows the information exchange interface in a state where the receiver as a first device has been configured earlier on by an operator, while the devices of the refrigeration system, not being the receiver, are other devices of the refrigeration system. The state shown in FIG. 6 is where the refrigeration system is in operating, after configuration of the refrigeration system. As example, Pgc is 49.77 bar, which is below the limit of 100.00 bar configured as the upper alarm limit by the operator (see FIG. 1), and Prec reference is 35.00 bar, which is the value configured as the reference values by the operator (see FIG. 1).

Figure 7:
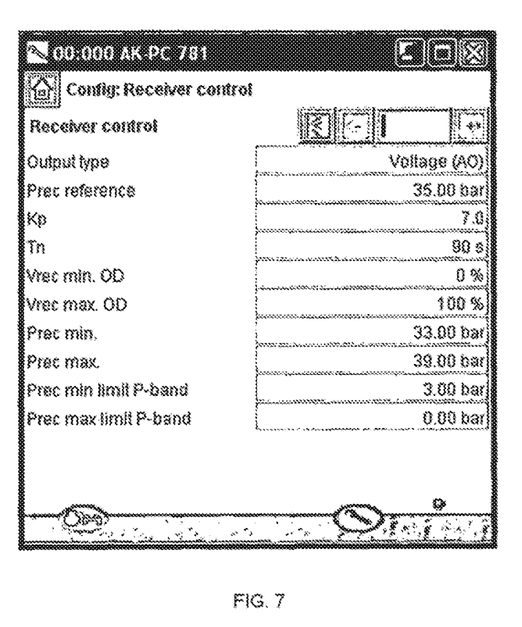
FIG. 7 is a sketch of an information exchange interface of a control unit for configuring operating parameters of the receiver of the refrigeration system.

FIG. 7 is a print-out of a view of the information exchange interface, where other operating parameters than Prec reference of the receiver may be configured.

| Output type | Voltage (AO) |
|---|---|
| Prec reference | 35.00 bar |
| Kp | 7.0 |
| Tn | 90 s |
| Vrec min. OD | 0% |
| Vrec max. OD | 100% |
| Prec min. | 33.00 bar |
| Prec max. | 39.00 bar |
| Prec min limit P-band | 3.00 bar |
| Prec max limit P-band | 0.00 bar |

In FIG. 7, further configuration by the operator is made by configuring one or more of the operating parameters listed above. Configuration of one or more of the parameters listed above may be performed by the operator to change the automatic configuration made by the control unit based upon configuration of Smart Pgc max. and/or the configuration of Smart Prec ref. Alternatively, configuration of one or more of the parameters listed above may be performed by the operator to configure operating parameters, which the control unit does not configure automatically. With reference to FIG. 7, the first device configured is the receiver and the operating parameter 35.00 bar, as shown in FIG. 5, of the first device is the pressure of the refrigerant inside the receiver (See FIG. 1).

The invention is described with reference to a certain part of a refrigeration system, with reference to certain devices of the part of the refrigeration system and with reference to certain operating parameters of the plurality of devices. The skilled person will know how to adopt the method according to the invention to other parts of a refrigeration system, the other parts of a refrigeration system comprising similar or other devices, and the similar or other devices being configured with similar or other operating parameters for one or more first devices and for other devices of the other part of a refrigeration system.

What is claimed is:

1. An information exchange interface on a control unit of at least part of a refrigeration system the configuring operating parameters of a plurality of devices of the refrigeration system, the information exchange interface, when executed on the control unit, configured to perform steps comprising:
    selecting among the plurality of devices of the refrigeration system, on the control unit of the at least part of the refrigeration system, a first device to configure, wherein the selecting include operator input;
    providing, on the control unit of the at least part of the refrigeration system, information of valid configurable operating parameters of the first device;
    selecting at least one of the valid configurable operating parameters of the first device, thereby configuring the first device;
    providing, on the control unit of the at least part of the refrigeration system, information of operating parameters of other devices of the refrigeration system, based on the configuration of the first device, wherein providing information of the parameters of the other devices is provided dynamically;
    the information of the set of operating parameters of the other devices being based on stored data of the plurality of devices of the refrigeration system;
    confirming, on the control unit of the at least part of the refrigeration system, one or more operating parameters of one or more of the other devices, thereby configuring the one or more other devices; and
    designating a condenser as the first device controlled by the control unit of the at least part of the refrigeration system.

2. The method according to claim 1, wherein the method comprises the following steps preliminary to the step of confirming, on the control unit of the at least part of the refrigeration system, one or more parameters of one or more of the other devices:
    providing, on the control unit of the at least part of the refrigeration system, information of valid configurable parameters of one or more of the other devices, and selecting at least one of the valid configurable parameters of the one or more other devices, thereby configuring the one or more other devices.

3. The method according to claim 2, wherein the step of selecting, on the control unit of the at least part of the refrigeration system, the first device includes
providing information, on the control unit of the at least part of the refrigeration system, of a plurality of devices to be configured of at least part of the refrigeration system, and
the step of selecting at least one valid configurable operating parameter of the first device is performed by designating the first device and/or by designating a parameter.

4. The method according to claim 2, where the step of selecting, on the control unit of the at least part of the refrigeration system, the first device includes
displaying a drawing of a plurality of devices to be configured of at least part of the refrigeration system, and
where the first device is displayed in the drawing of the plurality of devices of the part of the refrigeration system, and
where selecting the first device is performed by designating the first device in the drawing.

5. The method according to claim 1, wherein the step of selecting, on the control unit of the at least part of the refrigeration system, the first device includes
providing information, on the control unit of the at least part of the refrigeration system, of a plurality of devices to be configured of at least a part of the refrigeration system, and
the step of selecting at least one valid configurable operating parameter of the first device is performed by designating the first device and/or by designating a parameter.

6. The method according to claim 5, where the selection of the first device is performed by one or more of the following actions: touching on a touch-screen display of the control unit a row, column or cell naming the first device, or speaking out to a microphone of the control unit a naming of the first device.

7. The method according to claim 6, where the step of selecting, on the control unit of the at least part of the refrigeration system, the first device includes
displaying a drawing of a plurality of devices to be configured of at least part of the refrigeration system, and
where the first device is displayed in the drawing of the plurality of devices of the part of the refrigeration system, and
where selecting the first device is performed by designating the first device in the drawing.

8. The method according to claim 5, where the step of selecting, on the control unit of the at least part of the refrigeration system, the first device includes
displaying a drawing of a plurality of devices to be configured of at least part of the refrigeration system, and
where the first device is displayed in the drawing of the plurality of devices of the part of the refrigeration system, and
where selecting the first device is performed by designating the first device in the drawing.

9. The method according to claim 1, where the step of selecting, on the control unit of the at least part of the refrigeration system, the first device includes displaying a drawing of a plurality of devices to be configured of at least part of the refrigeration system, and where the first device is displayed in the drawing of the plurality of devices of the part of the refrigeration system, and where selecting the first device is performed by designating the first device in the drawing.

10. The method according to claim 9, where the selection of the first device is performed by one or more of the following actions: touching the first device in the drawing on a touch screen of the control unit, or speaking out to a microphone of the control unit a naming of the first device as named in the drawing.

11. An information exchange interface on a control unit of at least part of a refrigeration system for configuring operating parameters of a plurality of devices of the refrigeration system, the information exchange interface, when executed on the control unit, configured to perform steps comprising:
selecting among the plurality of devices of the refrigeration system, on the control unit of the at least part of the refrigeration system, a first device to configure, wherein the selecting include operator input;
providing, on the control unit of the at least part of the refrigeration system, information of valid configurable operating parameters of the first device;
selecting at least one of the valid configurable operating parameters of the first device, thereby configuring the first device;
providing, on the control unit of the at least part of the refrigeration system, information of operating parameters of other devices of the refrigeration system, based on the configuration of the first device, wherein the information of the set of operating parameters of the other devices being based on stored data of the plurality of devices of the refrigeration system and wherein providing information of the parameters of the other devices is provided dynamically;
confirming, on the control unit of the at least part of the refrigeration system, one or more operating parameters of one or more of the other devices, thereby configuring the one or more other devices; and
designating a receiver as the first device controlled by the control unit of the at least part of the refrigeration system.

12. The method according to claim 11, wherein the method comprises the following steps preliminary to the step of confirming, on the control unit of the at least part of the refrigeration system, one or more parameters of one or more of the other devices:
providing, on the control unit of the at least part of the refrigeration system, information of valid configurable parameters of one or more of the other devices, and
selecting at least one of the valid configurable parameters of the one or more other devices, thereby configuring the one or more other devices.

13. The method according to claim 12, wherein the at least one parameter to be selected is a pressure of refrigerant within the receiver.

14. The method according to claim 12, where the step of selecting, on the control unit of the at least part of the refrigeration system, the first device includes
displaying a drawing of a plurality of devices to be configured of at least part of the refrigeration system, and
where the first device is displayed in the drawing of the plurality of devices of the part of the refrigeration system, and where selecting the first device is performed by designating the first device in the drawing.

15. The method according to claim 11, wherein the step of selecting, on the control unit of the at least part of the refrigeration system, the first device includes
providing information, on the control unit of the at least part of the refrigeration system, of a plurality of devices to be configured of at least a part of the refrigeration system, and
the step of selecting at least one valid configurable operating parameter of the first device is performed by designating the first device and/or by designating a parameter.

16. The method according to claim 15, where the selection of the first device is performed by one or more of the following actions: touching on a touch-screen display of the control unit a row, column or cell naming the first device, or speaking out to a microphone of the control unit a naming of the first device.

17. The method according to claim 15, wherein the at least one parameter to be selected is a pressure of refrigerant within the receiver.

18. The method according to claim 11, where the step of selecting, on the control unit of the at least part of the refrigeration system, the first device includes displaying a drawing of a plurality of devices to be configured of at least part of the refrigeration system, and where the first device is displayed in the drawing of the plurality of devices of the part of the refrigeration system, and where selecting the first device is performed by designating the first device in the drawing.

19. The method according to claim 18, where the selection of the first device is performed by one or more of the following actions: touching the first device in the drawing on a touch screen of the control unit, or speaking out to a microphone of the control unit a naming of the first device as named in the drawing.

20. The method according to claim 11, wherein the at least one parameter to be selected is a pressure of refrigerant within the receiver.

* * * * *

UNITED STATES PATENT AND TRADEMARK OFFICE
CERTIFICATE OF CORRECTION

PATENT NO. : 10,208,994 B2
APPLICATION NO. : 15/840573
DATED : February 19, 2019
INVENTOR(S) : Kenneth B. Madsen et al.

It is certified that error appears in the above-identified patent and that said Letters Patent is hereby corrected as shown below:

In the Claims

Claim 2, Column 10, Line 60, "method" should correctly appear as --interface--.

Claim 2, Column 10, Lines 60-61, ",wherein the method comprises" should correctly appear as --comprising--.

Claim 3, Column 11, Line 4, "method" should correctly appear as --interface--.

Claim 4, Column 11, Line 15, "method" should correctly appear as --interface--.

Claim 5, Column 11, Line 26, "method" should correctly appear as --interface--.

Claim 6, Column 11, Line 37, "method" should correctly appear as --interface--.

Claim 7, Column 11, Line 43, "method" should correctly appear as --interface--.

Claim 8, Column 11, Line 54, "method" should correctly appear as --interface--.

Claim 9, Column 11, Line 65, "method" should correctly appear as --interface--.

Claim 10, Column 12, Line 7, "method" should correctly appear as --interface--.

Claim 12, Column 12, Line 45, "method" should correctly appear as --interface--.

Claim 12, Column 12, Lines 45-46, ",wherein the method comprises" should correctly appear as --comprising--.

Claim 13, Column 12, Line 56, "method" should correctly appear as --interface--.

Signed and Sealed this
Second Day of July, 2019

Andrei Iancu
*Director of the United States Patent and Trademark Office*

CERTIFICATE OF CORRECTION (continued)
U.S. Pat. No. 10,208,994 B2

Claim 14, Column 12, Line 59, "method" should correctly appear as --interface--.

Claim 15, Column 13, Line 3, "method" should correctly appear as --interface--.

Claim 16, Column 13, Line 14, "method" should correctly appear as --interface--.

Claim 17, Column 13, Line 20, "method" should correctly appear as --interface--.

Claim 18, Column 14, Line 1, "method" should correctly appear as --interface--.

Claim 19, Column 14, Line 10, "method" should correctly appear as --interface--.

Claim 20, Column 14, Line 16, "method" should correctly appear as --interface--.